US012551399B1

(12) United States Patent
Zhou

(10) Patent No.: US 12,551,399 B1
(45) Date of Patent: Feb. 17, 2026

(54) SPIRAL PERISTALTIC ADULT ARTICLE TECHNOLOGY

(71) Applicant: Xuejiang Zhou, Chongqing (CN)

(72) Inventor: Xuejiang Zhou, Chongqing (CN)

( * ) Notice: Subject to any disclaimer, the term of this patent is extended or adjusted under 35 U.S.C. 154(b) by 0 days.

(21) Appl. No.: 19/015,388

(22) Filed: Jan. 9, 2025

(51) Int. Cl.
*A61H 19/00* (2006.01)
*A61H 15/00* (2006.01)
*A61H 23/02* (2006.01)

(52) U.S. Cl.
CPC ......... *A61H 19/44* (2013.01); *A61H 15/0085* (2013.01); *A61H 23/0254* (2013.01); *A61H 2015/0042* (2013.01); *A61H 2201/02* (2013.01); *A61H 2201/1215* (2013.01); *A61H 2201/123* (2013.01); *A61H 2201/1669* (2013.01); *A61H 2201/1673* (2013.01); *A61H 2205/087* (2013.01)

(58) Field of Classification Search
CPC ................ A61H 15/00; A61H 15/0085; A61H 2015/0042; A61H 19/44; A61H 23/0254; A61H 2205/087
See application file for complete search history.

(56) References Cited

U.S. PATENT DOCUMENTS 11,826,300 B1 * 11/2023 Zhou ...................... A61H 19/34
12,186,256 B1 * 1/2025 Zhong .................... A61H 19/34
2006/0047181 A1 * 3/2006 Hsu ........................ A61H 21/00 600/38
2006/0069330 A1 * 3/2006 Nan ....................... A61H 19/34 601/72
2008/0119767 A1 * 5/2008 Berry ..................... A61H 21/00 601/46
2010/0121234 A1 * 5/2010 Nan ....................... A61H 19/44 601/134
2013/0178769 A1 * 7/2013 Schmidt ............. A61H 23/0263 601/46
2013/0345501 A1 * 12/2013 O'Reilly ................ A61H 19/44 600/38
2016/0015596 A1 * 1/2016 Murison ................ A61H 19/44 600/38
2021/0045964 A1 * 2/2021 Haddock Dicarlo ........................ A61H 15/0085
2023/0024137 A1 * 1/2023 Larkin ................... A61H 19/44
2023/0320924 A1 * 10/2023 Zhou .................... A61H 9/0057 601/6
2024/0382376 A1 * 11/2024 Zhang ................ A61H 23/0254

* cited by examiner

*Primary Examiner* — Colin W Stuart
*Assistant Examiner* — Douglas Y Sul
(74) *Attorney, Agent, or Firm* — JEEN IP LAW, LLC

(57) ABSTRACT

The application relates to the technical field of adult articles, and discloses a spiral crawling adult article technology, which comprises a shell 1 connected with a shell 2, wherein a driving component is installed in the shell 2; The telescopic rod is used for driving the driving motor to linearly reciprocate; The screw rod is movably provided with balls outside; A shell 3, in which a vibration motor is installed; The outer sleeve is sleeved outside the first shell, and the second shell, the third shell, the screw rod and the ball are all located in the outer sleeve, and when the screw rod and the ball rotate, the ball will squeeze the outer sleeve to generate indirect bulge.

5 Claims, 7 Drawing Sheets

SPIRAL PERISTALTIC ADULT ARTICLE TECHNOLOGY

TECHNICAL FIELD

The invention relates to the technical field of adult articles, in particular to a spiral peristaltic adult article technology.

TECHNICAL BACKGROUND

With the improvement of people's living standards, adult products technology has gradually become a common equipment for modern people to relieve fatigue and relax. At present, the adult products technology on the market mainly relies on simple vibration or fixed point pressing mode for massage, which can play a certain relaxing effect, but there are the following problems:

The massage effect is single: most of the existing adult products are designed by simple vibration or static pressing, which makes it difficult to realize continuous and dynamic local massage and meet the relaxation needs of deep muscles.

Uneven local stimulation: the traditional adult products technology has fixed contact parts and uneven distribution of massage strength, which can not cover a large area, resulting in limited massage effect.

SUMMARY OF THE INVENTION

Aiming at the shortcomings of the prior art, the invention provides a spiral peristaltic adult product technology, which solves the problems of single massage effect and uneven local stimulation in the prior art.

In order to achieve the above objectives, the invention is realized through the following technical scheme: a spiral peristaltic adult product technology comprises:

- The first shell is connected with the second shell, and a driving component is installed inside the second shell;
- The telescopic rod is used for driving the driving motor to linearly reciprocate, and both the telescopic rod and the driving motor are installed in the first shell;
- The screw rod is movably provided with balls outside, and the screw rod and the balls rotate along with the driving motor;
- The shell 3 rotates along with the screw rod and is internally provided with a vibration motor for vibrating the shell 3;
- The outer sleeve is sleeved outside the first shell, and the second shell, the third shell, the screw rod and the ball are all located in the outer sleeve, and when the screw rod and the ball rotate, the ball will squeeze the outer sleeve to generate indirect bulge.

Preferably, the driving assembly comprises a driving motor, which is fixed in the second shell, and the output end of the driving motor is provided with an eccentric shaft; a connecting piece is movably arranged outside the eccentric shaft; one side of the connecting piece is provided with a transmission shaft; one side of the transmission shaft is provided with an output rod; and one side of the second shell is provided with a sealing sleeve, and both the transmission shaft and the output rod are located in the sealing sleeve.

Preferably, the inner bottom of the first shell is provided with a storage battery, and the storage battery is used for providing electric energy to the driving motor, the driving motor, the telescopic rod and the vibration motor.

Preferably, the screw rod is arranged in a hollow structure, and is used for arranging lines to connect the storage battery with the vibration motor.

Preferably, an elastic rod is installed at the output end of the driving motor, and the elastic rod is located in the screw rod.

Preferably, a plurality of grooves are formed outside the screw rod, the balls are located in the grooves, and the balls are distributed in a spiral shape.

The invention provides a spiral peristaltic adult product technology. Has the following beneficial effects:

1. According to the invention, the screw rod can be driven to rotate inside the jacket by using the driving motor, at this time, the screw rod can drive the ball to move, and the outer wall of the ball can be pushed up by contacting with the inner wall of the jacket, so that the ball can roll along with the screw rod, so that different positions of the jacket can be indirectly raised, which can better stimulate the PC muscle group and the vaginal sphincter, accelerate the contraction and expansion of the vaginal sphincter, and improve the use effect.
2. By driving the electric push rod, the invention can drive the driving motor to make reciprocating linear movement, and then drive the screw rod to make reciprocating movement, and at this time, the movement range of the ball can be increased, so as to realize large-scale and multi-directional stimulation of PC muscle groups and vaginal sphincter.
3. According to the invention, the shell 3 can vibrate by driving the vibration motor, and at this time, the stimulation to human muscles can be increased, and the shell 3 can also rotate along with the screw rod, and at the same time, it can perform reciprocating linear displacement along with the screw rod, so that the A-point area can be continuously and indirectly squeezed and expanded, so that it is in a state of frequent expansion and contraction, and further the pleasure intensity can be improved.
4. According to the invention, the eccentric shaft is driven to rotate by the driving motor, and at this time, the eccentric shaft can drive the connecting piece to make the transmission shaft move, so as to drive the output rod to move back and forth, so that the point C of the human body can be stimulated synchronously with the screw rod, thereby achieving the purpose of auxiliary stimulation and improving the use effect of the device.

Wherein, 1, a shell 1; 2. Shell 2; 3. Drive assembly; 31. Drive motor; 32, eccentric shaft; 33. Connectors; 34. Transmission shaft; 35. Output rod; 36. Sealing sleeve; 4. Battery;

5, telescopic rod; 6. Drive the motor; 7. Screw rod; 8. Shell III; 9. Vibration motor; 10. Ball; 11. Elastic rod; 12. coat; 13, groove.

DETAILED DESCRIPTION

In the following, the technical scheme in the embodiment of the invention will be clearly and completely described with reference to the drawings in the specification of the invention. Obviously, the described embodiment is only a part of the embodiment of the invention, but not the whole embodiment. Based on the embodiments in the present invention, all other embodiments obtained by ordinary technicians in the field without creative labor belong to the scope of protection of the present invention.

In order to better understand the present invention, the above contents will be described in detail with specific examples.

Figure 1:
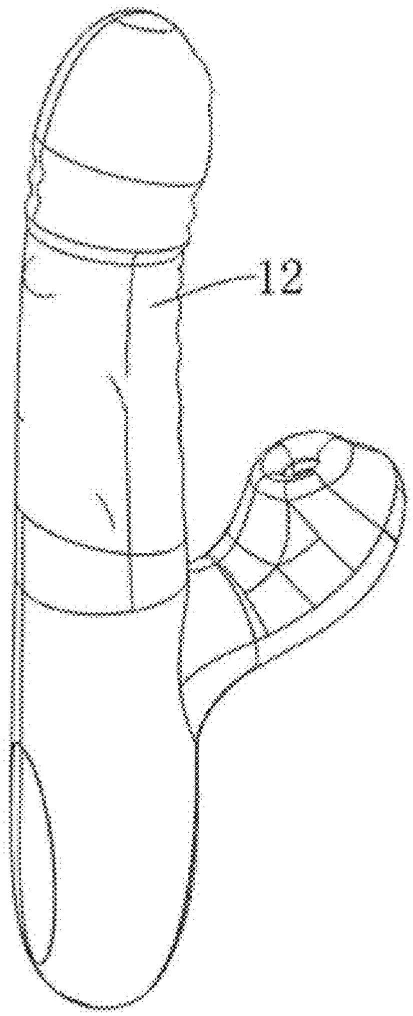
FIG. 1 is a schematic diagram of the three-dimensional structure of the present invention.
Figure 2:
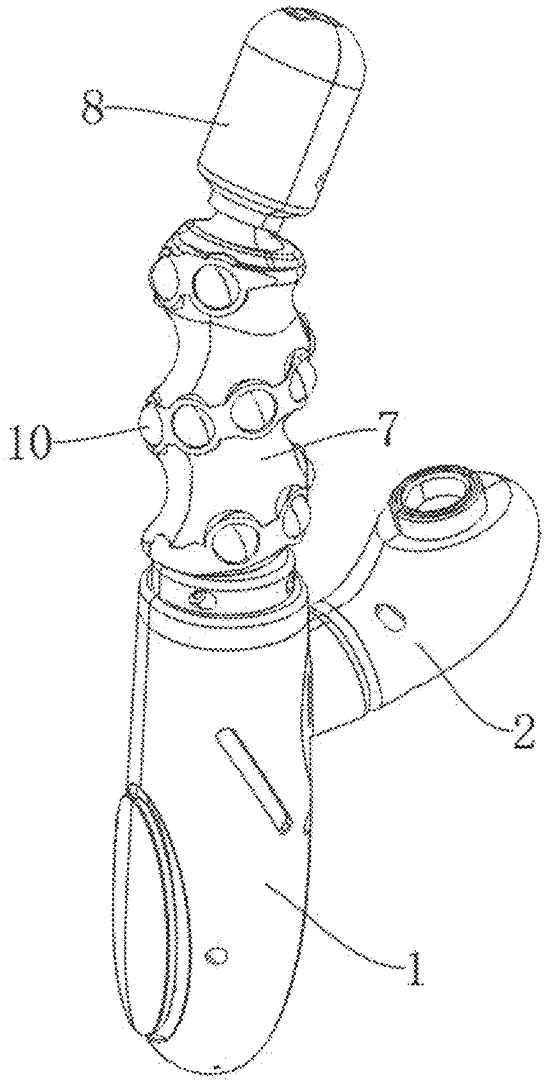
FIG. 2 is a schematic structural diagram of the spiral rod part of the present invention.
Figure 3:
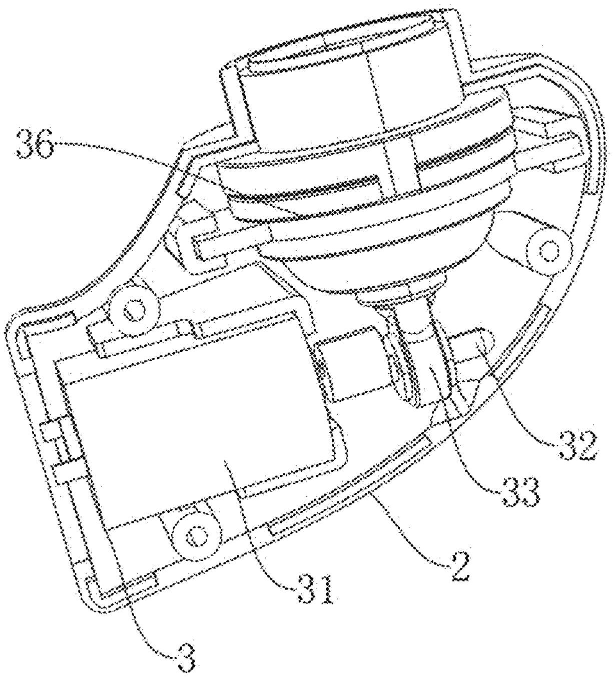
FIG. 3 is a schematic diagram of the internal structure of the second shell of the present invention.
Figure 4:
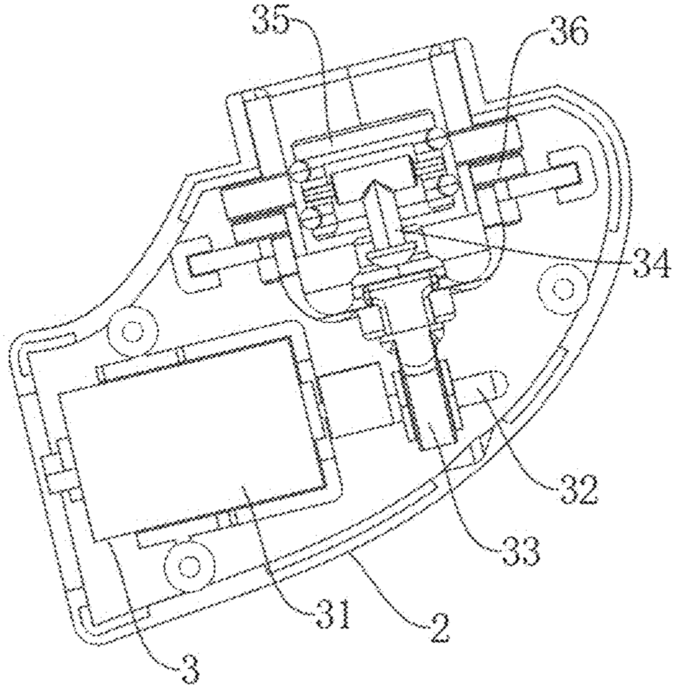
FIG. 4 is a schematic structural diagram of the transmission shaft of the present invention.
Figure 5:
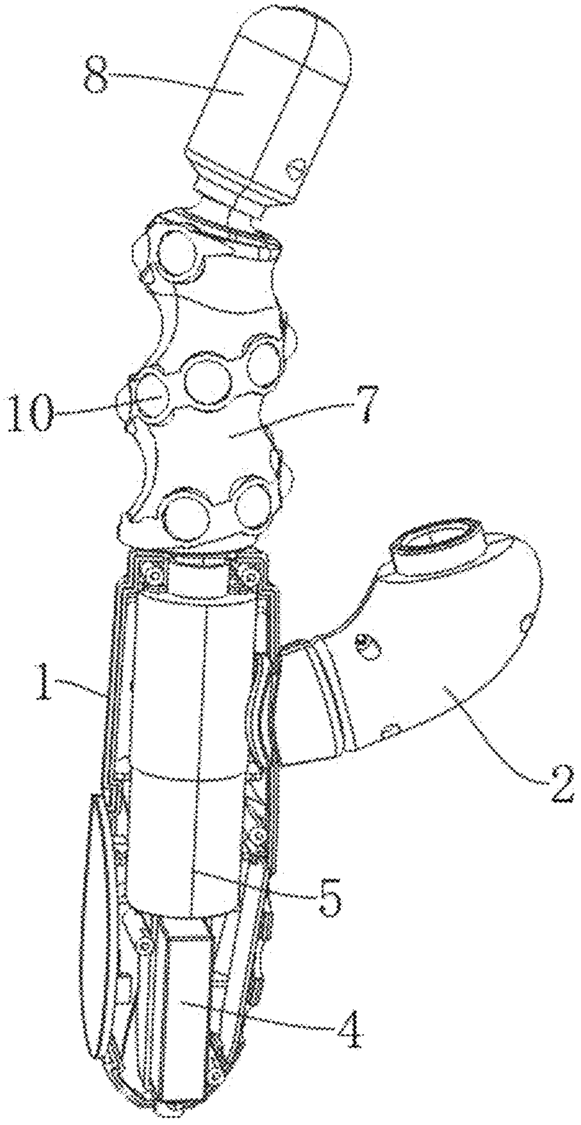
FIG. 5 is a schematic structural diagram of the telescopic rod of the present invention.
Figure 6:
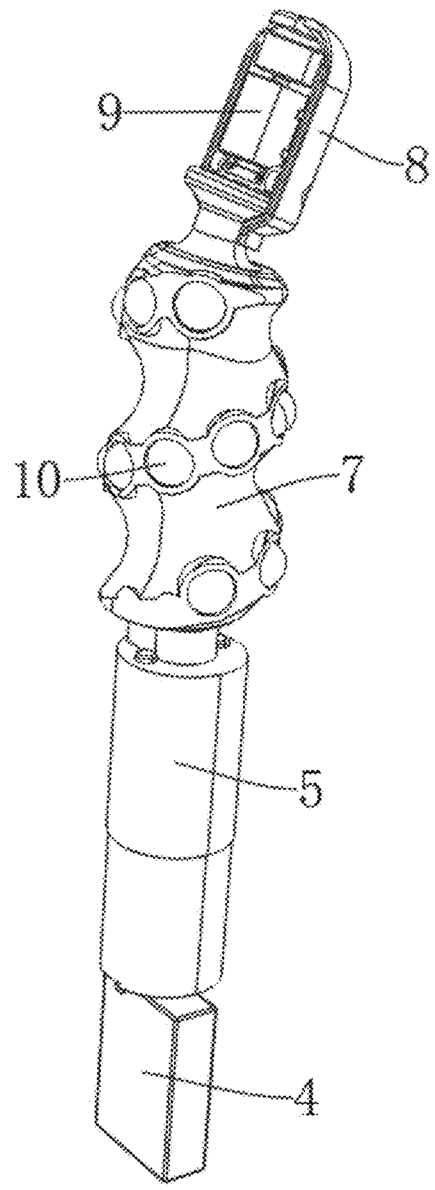
FIG. 6 is a schematic structural diagram of the vibration motor of the present invention.
Figure 7:
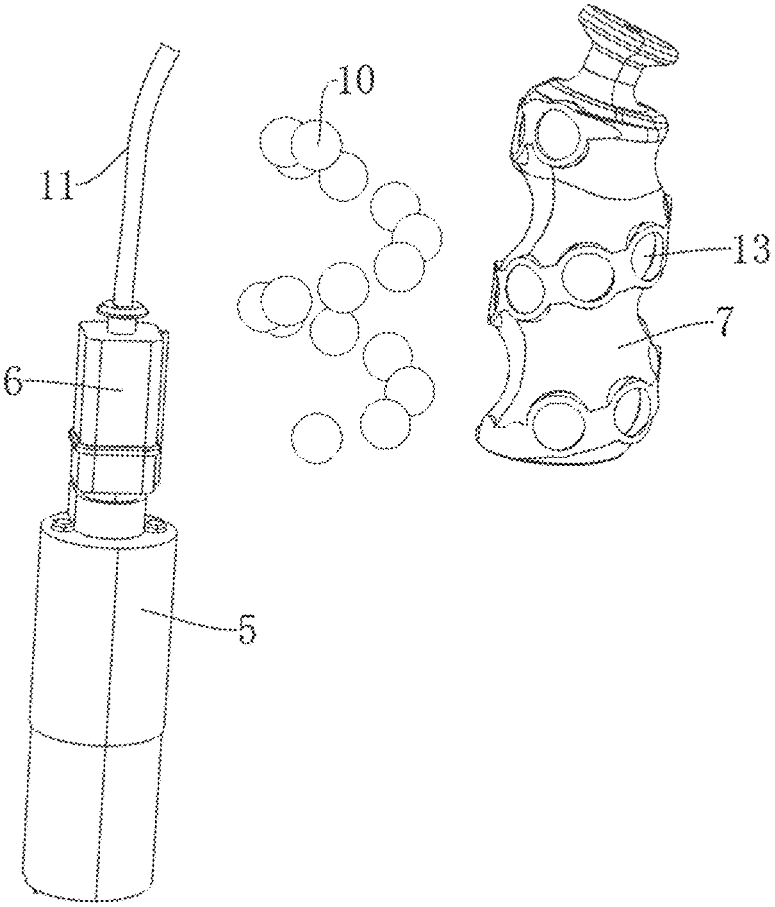
FIG. 7 is an exploded view of the ball part structure of the present invention.

Please refer to FIG. 1-FIG. 7. The embodiment of the present invention provides a spiral peristaltic adult product technology, which includes: a first shell 1, which is connected with a second shell 2, and a driving assembly 3 is installed inside the second shell 2; The telescopic rod 5 is used for driving the driving motor 6 to linearly reciprocate, and both the telescopic rod 5 and the driving motor 6 are installed in the first housing 1; The screw rod 7 is movably provided with a ball 10 outside, and the screw rod 7 and the ball 10 rotate together with the driving motor 6; A housing 38 which rotates along with the screw rod 7 and is internally provided with a vibration motor 9 for vibrating the housing 38; The outer sleeve 12 is sleeved outside the first shell 1, and the second shell 2, the third shell 8, the screw rod 7 and the ball 10 are all located in the outer sleeve 12, and when the screw rod 7 and the ball 10 rotate, the ball 10 will squeeze the outer sleeve 12 to make it indirectly protrude.

In this embodiment, the telescopic rod 5 is installed in the first housing 1 for driving the driving motor 6 to linearly reciprocate; A ball 10 is movably arranged outside the screw rod 7. When the screw rod 7 rotates under the action of the driving motor 6, it drives the ball 10 to rotate synchronously, and the ball 10 cooperates with the screw rod 7 to generate rolling. The shell 38 rotates synchronously with the screw rod 7, and a vibration motor 9 is installed inside the shell 38 to make the shell 38 vibrate; The outer sleeve 12 is sleeved outside the first shell 1, covering the second shell 2, the third shell 8, the screw rod 7 and the ball 10. When the screw rod 7 and the ball 10 rotate, the ball 10 squeezes the inner wall of the outer sleeve 12 to form an indirect bulge on its outer surface, which constantly changes with the movement position of the ball 10, thus realizing the dynamic massage effect on the lower body area of people.

The driving assembly 3 includes a driving motor 31, which is fixed in the shell 22. An eccentric shaft 32 is installed at the output end of the driving motor 31. A connecting piece 33 is movably arranged outside the eccentric shaft 32. A transmission shaft 34 is installed on one side of the connecting piece 33, and an output rod 35 is installed on one side of the transmission shaft 34. A sealing sleeve 36 is installed on one side of the shell 22, and both the transmission shaft 34 and the output rod 35 are located in the sealing sleeve 36.

In this embodiment, the driving assembly 3 includes a driving motor 31, which is fixedly installed inside the housing 22, and the output end of the driving motor 31 is connected with an eccentric shaft 32, and a connecting piece 33 is movably arranged outside the eccentric shaft 32 for transmitting the rotating motion of the motor to the subsequent structure; One side of the connector 33 is provided with a transmission shaft 34, and the other side of the transmission shaft 34 is provided with an output rod 35, which further transmits power through the transmission shaft 34; In addition, a sealing sleeve 36 is installed on one side inside the second housing 2. The sealing sleeve 36 is used to protect the transmission shaft 34 and the output rod 35 to ensure that they operate in a closed environment and avoid interference from external factors, thus improving the stability and durability of the drive assembly 3.

A storage battery 4 is installed at the inner bottom of the first housing 1, and is used for providing electric energy to the driving motor 31, the driving motor 6, the telescopic rod 5 and the vibration motor 9.

In this embodiment, the battery 4 is installed at the inner bottom of the housing 1. As the power supply unit of the device, the battery 4 is responsible for providing stable electric energy to the drive motor 31, the drive motor 6, the telescopic rod 5 and the vibration motor 9, ensuring the normal operation of each component, realizing the linear reciprocating motion, rotation and vibration functions of the device, thus improving the overall massage effect and use experience.

The screw rod 7 is arranged in a hollow structure, and is used for arranging lines to connect the storage battery 4 with the vibration motor 9. An elastic rod 11 is installed at the output end of the driving motor 6, and the elastic rod 11 is located in the screw rod 7.

In this embodiment, the screw rod 7 is designed as a hollow structure, which is used for internally arranging lines and connecting the storage battery 4 with the vibration motor 9 to provide electric energy support. At the same time, the output end of the drive motor 6 is equipped with an elastic rod 11, which is located in the hollow interior of the screw rod 7, so that the power of the drive motor 6 can be effectively transmitted to the screw rod 7, and the stable and flexible rotation movement can be realized, and the ball 10 and vibration function are further matched to improve the overall massage effect.

A plurality of grooves 13 are formed outside the screw rod 7, and a plurality of balls 10 are located in the grooves 13, and the balls 10 are distributed in a spiral shape.

In this embodiment, a plurality of grooves 13 are formed outside the screw rod 7, and a plurality of balls 10 are installed in these grooves 13, and the balls 10 are distributed in a spiral shape along the outer surface of the screw rod 7. When the screw rod 7 is rotated by the driving motor 6, the ball 10 rolls along with it and keeps a stable movement in the groove 13. The ball 10 contacts with the inner wall of the outer sleeve 12 and squeezes the outer sleeve 12, so that the outer surface of the outer sleeve 12 is indirectly convex. With the rotation of the screw rod 7, the convex phenomenon dynamically moves along the spiral trajectory of the ball 10, thus achieving a large-scale, continuous and high-quality massage effect.

Working principle: When the device is used for massage, the battery 4 will supply power to the telescopic rod 5, the drive motor 31, the drive motor 6 and the vibration motor 9, and then the device can be operated, and the massage can be performed after the device is put into the lower body. When the drive motor 31 is operated, the eccentric shaft 32 will be driven to rotate, and the eccentric shaft 32 will drive the connecting piece 33 to move. The connecting piece 33 will drive the transmission shaft 34 to make the output rod 35 move inside the sealing sleeve 36, which can stimulate the area at the user's point A. When the telescopic rod 5 runs, it can drive the driving motor 6, the screw rod 7, the ball 10, the housing 38 and the vibration motor 9 to move linearly, thus achieving the reciprocating telescopic effect. When the driving motor 6 moves, The elastic rod 11 can be driven to rotate the screw rod 7, the ball 10, the shell 38 and the vibration motor 9, and when the vibration motor 9 is running, the shell 38 can be driven to vibrate, and then the device is placed at the part where the human body needs to be massaged, so as to realize massage, and the screw rod 7, the ball 10 and the shell 38 can be driven to rotate and reciprocate in the jacket 12 through the cooperation of the telescopic rod 5, the driving motor 6 and the vibration motor 9. Moreover, the shell 38 can generate vibration while rotating and reciprocating, so as to improve the massage quality, and the length of the device can be extended when reciprocating, so that the deeper area of the user's lower body can be squeezed and vibrated; and when the ball 10 rotates with the screw rod 7, the outer shell 12 is fixed on the outer surface of the outer shell, so the ball 10 will roll when rotating with the screw rod 7, so that the outer surface of the outer shell 12 can be indirectly raised. Therefore, when in use, different areas in the lower body of the user can be continuously and indirectly squeezed, so that the vaginal sphincter and pelvic floor muscles are frequently and locally squeezed and stimulated, the frequency of expansion and contraction is accelerated, and the stimulation effect is further improved.

Although embodiments of the present invention have been shown and described, it will be understood by those skilled in the art that various changes, modifications, substitutions and variations can be made to these embodiments without departing from the principles and spirit of the present invention, the scope of which is defined by the appended claims and their equivalents.

The invention claimed is:

1. A spiral peristaltic adult technology device, comprising:

a first shell (1) connected with a second shell (2), and a driving assembly (3) installed in the second shell (2);

a telescopic rod (5) used for driving a first driving motor (6) to linearly reciprocate, and the telescopic rod (5) is installed in the first shell (1);

a screw rod (7) movably provided with balls (10) outside, and the screw rod (7) and the balls (10) rotate along with the first driving motor (6);

a third shell (8) which rotates along with the screw rod (7) and is internally provided with a vibration motor (9) for vibrating the third shell (8);

an outer sleeve (12) which covers the first shell (1), the second shell (2), the third shell (8), the screw rod (7) and the balls (10), wherein the first shell (1), the second shell (2), the third shell (8), the screw rod (7) and the balls (10) are all located in the outer sleeve (12), and when the screw rod (7) and the balls (10) rotate, the balls (10) press the outer sleeve (12);

a battery (4), wherein the battery (4) is fixedly mounted to an inner bottom of the first shell (1); the telescopic rod (5), the screw rod (7) and the vibration motor (9) are sequentially arranged along an axial direction of the first shell (1), extending distally from the battery (4); and wherein the screw rod (7) defines a hollow interior structure configured to accommodate the first driving motor (6).

2. The spiral peristaltic adult technology device according to claim 1, wherein the driving assembly (3) comprises:

a second driving motor (31), which is fixed in the second shell (2);

an eccentric shaft (32) installed at an output end of the second driving motor (31), and an outside of the eccentric shaft (32) is movably arranged;

a transmission shaft (34);

an output rod (35) arranged on one side of the transmission shaft (34); and a sealing sleeve (36) installed inside the second shell (2) to accommodate both the transmission shaft (34) and the output rod (35).

3. The spiral peristaltic adult technology device according to claim 2, wherein the battery (4) is configured to provide electric energy to the second driving motor (31), the first driving motor (6), the telescopic rod (5) and the vibration motor (9).

4. The spiral peristaltic adult technology device according to claim 1, further comprising an elastic rod (11), wherein the elastic rod (11) is installed at an output end of the first driving motor (6), and the elastic rod (11) is located in the screw rod (7).

5. The spiral peristaltic adult technology device according to claim 1, further comprising a plurality of grooves (13), wherein the plurality of grooves (13) are formed outside the screw rod (7), the balls (10) are located in the grooves (13), and the balls (10) are distributed in a spiral shape.

* * * * *